(12) United States Patent
Nagasawa

(10) Patent No.: US 11,482,108 B2
(45) Date of Patent: Oct. 25, 2022

(54) VEHICLE WITH AUTOMATIC ACCIDENT REPORT FUNCTION AND SERVER APPARATUS

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/385,575

(22) Filed: Jul. 26, 2021

(65) Prior Publication Data
US 2022/0068137 A1 Mar. 3, 2022

(30) Foreign Application Priority Data
Aug. 31, 2020 (JP) .............................. JP2020-145301

(51) Int. Cl.
*B60W 30/08* (2012.01)
*G08G 1/16* (2006.01)
*G07C 5/00* (2006.01)

(52) U.S. Cl.
CPC ............. *G08G 1/162* (2013.01); *B60W 30/08* (2013.01); *G07C 5/008* (2013.01); *B60W 2030/082* (2013.01); *B60W 2540/221* (2020.02)

(58) Field of Classification Search
None
See application file for complete search history.

(56) References Cited

U.S. PATENT DOCUMENTS

| | | | |
|---|---|---|---|
| 8,520,695 B1* | 8/2013 | Rubin | G08G 1/096791 370/445 |
| 9,477,639 B2* | 10/2016 | Fischer | G06F 16/35 |
| 9,544,717 B2* | 1/2017 | Seino | H04L 47/24 |
| 9,663,113 B2* | 5/2017 | Catania | B60W 10/04 |
| 10,059,255 B1* | 8/2018 | Schreiber | H05B 47/16 |
| 10,165,429 B1* | 12/2018 | Young | H04W 4/40 |

(Continued)

FOREIGN PATENT DOCUMENTS

JP 2001-216588 A 8/2001

*Primary Examiner* — Muhammad Adnan
(74) *Attorney, Agent, or Firm* — McDermott Will & Emery LLP

(57) ABSTRACT

A vehicle with an automatic accident report function. The vehicle includes a transmitter, a collector, a determiner, and a vehicle estimator. The transmitter automatically transmits, to a server apparatus, accident emergency information that is usable by the server apparatus to estimate injury of an occupant of the vehicle when an accident of the vehicle is detected or forecasted. The collector collects, in the vehicle, information of the vehicle involved in the accident. The determiner determines whether a communication environment is appropriate for transmission of the information from the transmitter to the server apparatus. The vehicle estimator estimates the injury of the occupant, using the information collected by the collector. If the communication environment is inappropriate, the transmitter transmits, as the emergency information to the server apparatus, estimation results of the injury of the occupant estimated by the vehicle estimator, instead of the information of the vehicle collected by the collector.

9 Claims, 6 Drawing Sheets

(56) References Cited

U.S. PATENT DOCUMENTS

| | | | |
|---|---|---|---|
| 2012/0146812 A1* | 6/2012 | Ruy | G08G 1/164 |
| | | | 340/905 |
| 2013/0010980 A1* | 1/2013 | Yoshioka | G01S 3/802 |
| | | | 381/92 |
| 2015/0342542 A1* | 12/2015 | An | H04M 1/72421 |
| | | | 600/549 |
| 2015/0353081 A1* | 12/2015 | Kaminade | B60W 30/08 |
| | | | 701/1 |
| 2016/0284214 A1* | 9/2016 | Gao | G08G 1/09 |
| 2017/0038948 A1* | 2/2017 | Cun | G06F 3/017 |
| 2018/0089987 A1* | 3/2018 | Hosoi | G08B 25/08 |
| 2018/0137698 A1* | 5/2018 | Yasuda | H04N 7/18 |
| 2019/0263418 A1* | 8/2019 | Lee | G01C 21/3691 |
| 2020/0282895 A1* | 9/2020 | Yi | B60Q 1/50 |
| 2021/0035378 A1* | 2/2021 | Lekutai | H04W 4/024 |
| 2021/0125425 A1* | 4/2021 | Sussna | G06Q 10/20 |
| 2021/0304218 A1* | 9/2021 | Bahrami | H04L 63/08 |
| 2021/0390848 A1* | 12/2021 | Ogawa | G08G 1/0112 |
| 2022/0038880 A1* | 2/2022 | Nagasawa | H04W 4/44 |
| 2022/0038881 A1* | 2/2022 | Nagasawa | G08G 1/205 |
| 2022/0044496 A1* | 2/2022 | Inoue | H04W 4/027 |
| 2022/0063609 A1* | 3/2022 | Nagasawa | G08G 1/202 |

* cited by examiner

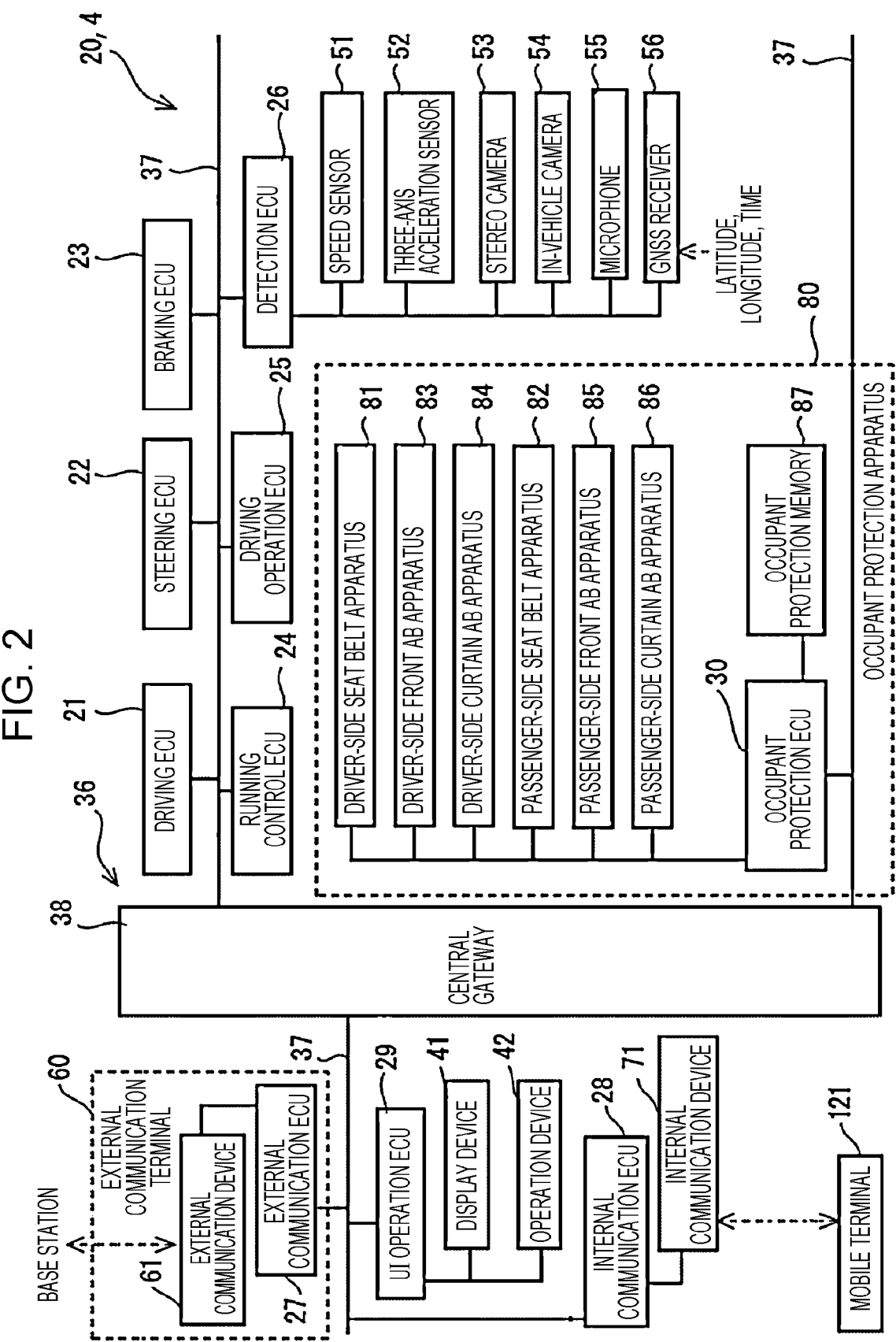

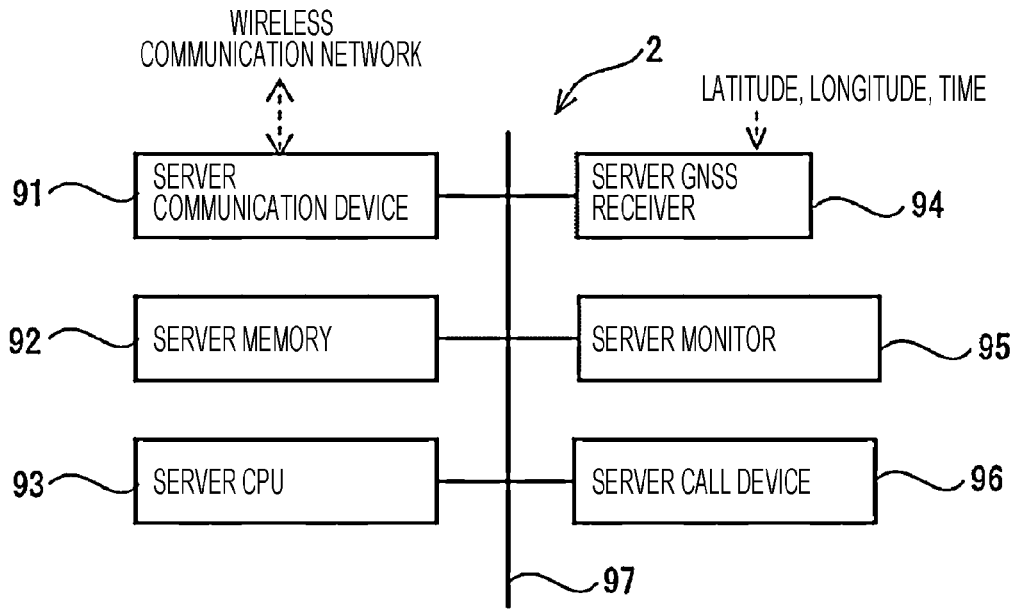
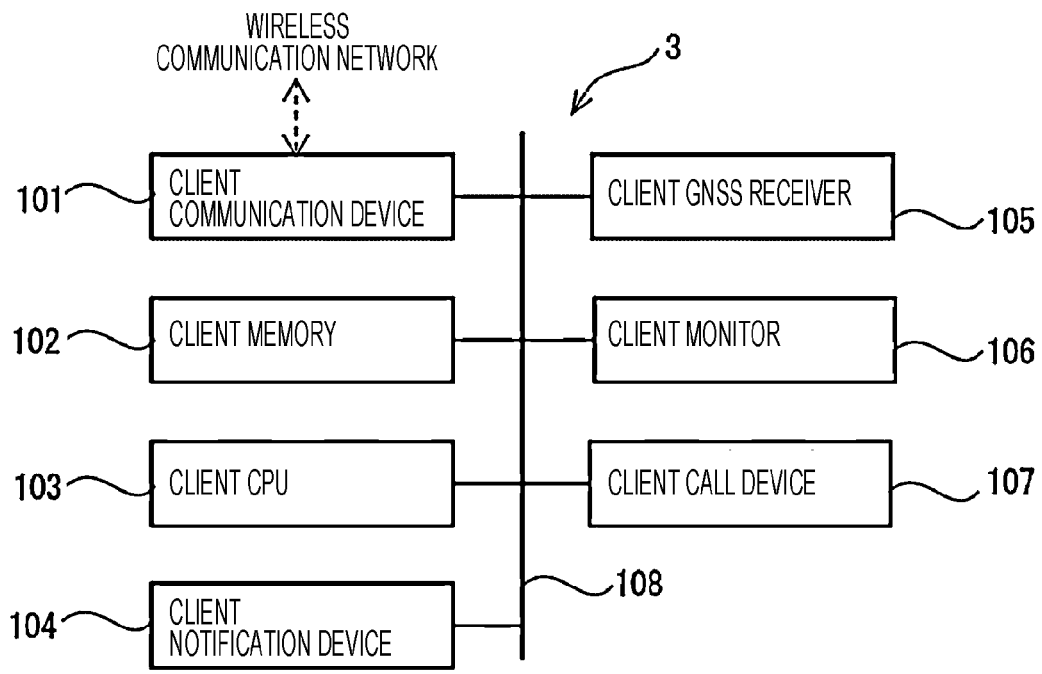

VEHICLE WITH AUTOMATIC ACCIDENT REPORT FUNCTION AND SERVER APPARATUS

CROSS-REFERENCE TO RELATED APPLICATIONS

The present application claims priority from Japanese Patent Application No. 2020-145301 filed on Aug. 31, 2020, the entire contents of which are hereby incorporated by reference.

BACKGROUND

The disclosure relates to a vehicle with an automatic accident report function and a server apparatus.

If an accident occurs for a vehicle such as an automobile, accident information may be reported. For example, an emergency report system is put into practical use for automobiles. With the emergency report system, an automobile involved in an accident transmits the accident information to a server apparatus at a call center by using an automatic report apparatus provided in the automobile (Japanese Unexamined Patent Application Publication No. 2001-216588). The accident information includes an operation state and the location of an occupant protection apparatus at the time of the accident and the input direction and strength of impact in the accident. At the call center, the server apparatus receives the accident information from one or more automobiles, and the accident information is checked to request the dispatch of a rescue team with an air ambulance or ambulance. This can shorten a lead time before the air ambulance or ambulance is dispatched. Thus, an occupant or occupants of the vehicle or vehicles involved in the accident are more likely to be saved.

SUMMARY

An aspect of the disclosure provides a vehicle with an automatic accident report function. The vehicle includes a transmitter, a collector, a determiner, and a vehicle estimator. The transmitter is configured to automatically transmit, from the vehicle to a server apparatus, accident emergency information that is usable by the server apparatus to estimate injury of an occupant of the vehicle when an accident of the vehicle is detected or forecasted. The collector is configured to collect, in the vehicle, information of the vehicle involved in the accident. The determiner is configured to determine whether a communication environment is appropriate for transmission of the information from the transmitter to the server apparatus. The vehicle estimator is configured to estimate the injury of the occupant of the vehicle, using the information collected by the collector. If the communication environment is inappropriate, the transmitter transmits, as the emergency information to the server apparatus, estimation results of the injury of the occupant estimated by the vehicle estimator, instead of the information of the vehicle collected by the collector.

An aspect of the disclosure provides a server apparatus including a receiver, a server estimator, and an outputter. The receiver is configured to receive accident emergency information that is automatically transmitted in response to a vehicle detecting or forecasting an accident. The server estimator is configured to estimate injury of an occupant of the vehicle on a basis of the emergency information when the receiver receives the emergency information. The outputter is configured to output estimation results of the injury of the occupant estimated by the server estimator. When the receiver receives, as the emergency information, estimation results of the injury of the occupant estimated by the vehicle instead of accident information that is usable by the server apparatus to estimate the injury of the occupant of the vehicle, the outputter outputs the estimation results of the injury of the occupant estimated by the vehicle.

An aspect of the disclosure provides a vehicle with an automatic accident report function. The vehicle includes a transmitter and circuitry. The transmitter is configured to automatically transmit, from the vehicle to a server apparatus, accident emergency information that is usable by the server apparatus to estimate injury of an occupant of the vehicle when an accident of the vehicle is detected or forecasted. The circuitry is configured to collect, in the vehicle, information of the vehicle involved in the accident. The circuitry is configured to determine whether a communication environment is appropriate for transmission of the information from the transmitter to the server apparatus. The circuitry is configured to estimate the injury of the occupant of the vehicle, using the information collected by the collector. If the communication environment is inappropriate, the transmitter transmits, as the emergency information to the server apparatus, estimation results of the injury of the occupant, instead of the information of the vehicle collected by the collector.

An aspect of the disclosure provides a server apparatus including a receiver and circuitry. The receiver is configured to receive accident emergency information that is automatically transmitted in response to a vehicle detecting or forecasting an accident. The circuitry is configured to estimate injury of an occupant of the vehicle on a basis of the emergency information when the receiver receives the emergency information. The circuitry is configured to output estimation results of the injury of the occupant. When the receiver receives, as the emergency information, estimation results of the injury of the occupant estimated by the vehicle instead of accident information that is usable by the server apparatus to estimate the injury of the occupant of the vehicle, the circuitry outputs the estimation results of the injury of the occupant estimated by the vehicle.

BRIEF DESCRIPTION OF THE DRAWINGS

FIG. 2 is an explanatory diagram of a control system of the automobile, the control system being capable of serving as an automatic report apparatus that transmits emergency information from the automobile involved in an accident in FIG. 1;

FIG. 3 is an explanatory diagram of a server apparatus used at a call center in FIG. 1;

FIG. 4 is an explanatory diagram of a client terminal used by a rescue team in FIG. 1;

DETAILED DESCRIPTION

Vehicles may be involved in an accident at any place in any environment.

For example, a vehicle may be involved in an accident in an environment where communication with a base station of an old type is possible, such as a suburb.

Furthermore, at a place where a plurality of automobiles are already involved in an accident, a new automobile may further be involved in the accident by being bumped, for example. In this case, at the same place, a large number of automobiles may be going to automatically report emergency information about the accident simultaneously.

In such a case, it may take time for each automobile to complete transmission of the accident emergency information after having been involved in the accident. If the transmission of the emergency information from the automobile involved in the accident delays, the time until the dispatch request for the rescue team based on the emergency information and the time for the rescue team to actually arrive at the accident site also delay.

In one example, in the future, it is assumed that the above-described emergency report system using advanced automatic collision notification (AACN) is improved and that each automobile involved in an accident automatically transmits a large amount of rich information to the server apparatus. Thus, the server apparatus may become capable of estimating the injury state of each occupant or the like involved in the accident in detail. However, for example, automatic transmission of such a large amount of emergency information from a plurality of vehicles to the server apparatus in the above-described communication environment may become a large obstacle for immediate emergency dispatch in response to the emergency report.

It is desirable to provide an emergency report system in which a vehicle involved in an accident can automatically report, to a server apparatus, information to be used for determination of the accident while suppressing delay of emergency dispatch in response to emergency information from the vehicle involved in the accident.

Now, an embodiment of the disclosure will be described with reference to the drawings.

Figure 1:
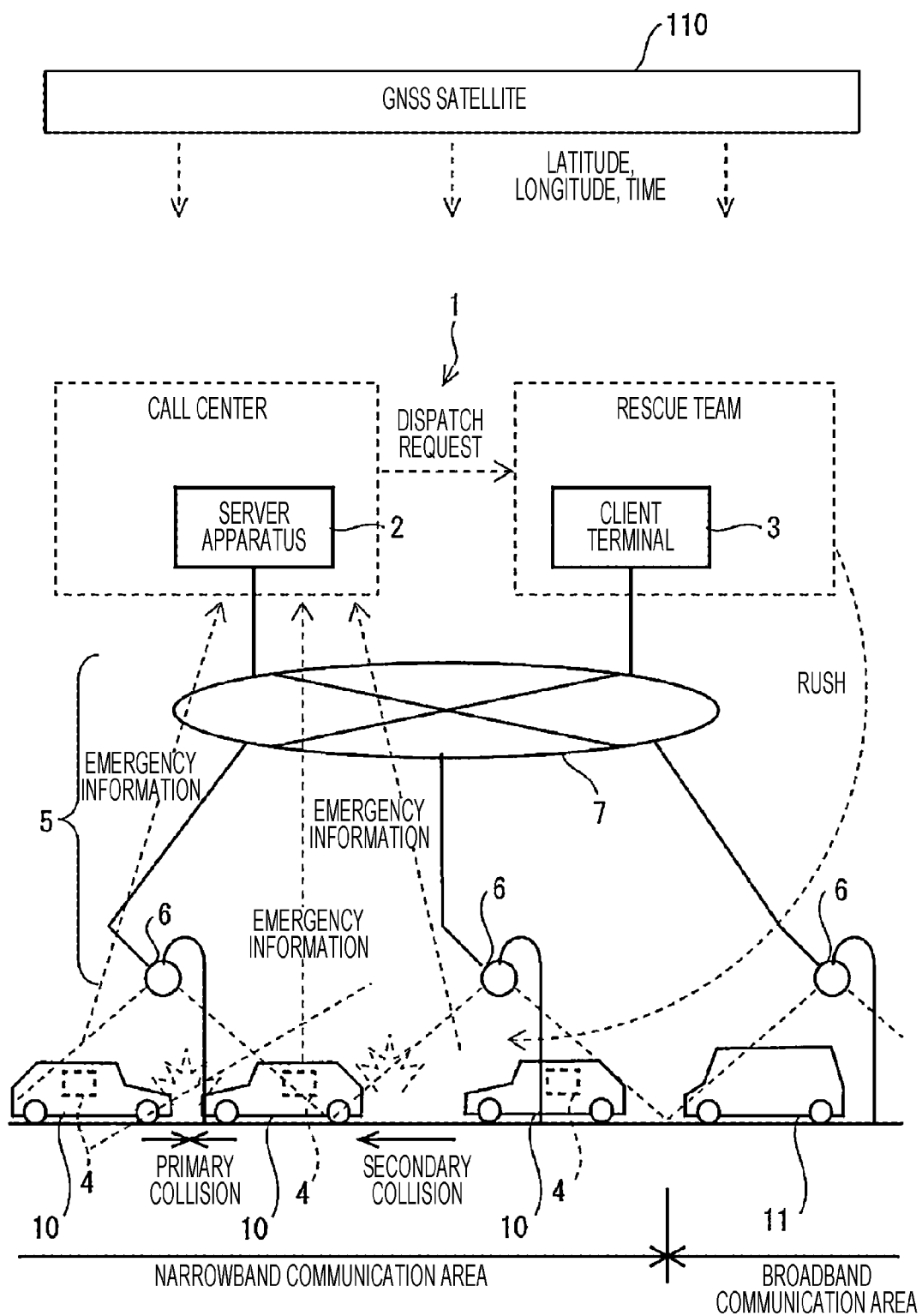
FIG. 1 is an explanatory diagram illustrating an example of an emergency report system for an automobile according to an embodiment of the disclosure.

FIG. 1 is an explanatory diagram illustrating an example of an emergency report system 1 for an automobile 10 according to the embodiment of the disclosure.

The emergency report system 1 in FIG. 1 includes a server apparatus 2, a client terminal 3, an automatic report apparatus 4, and a wireless communication network 5. The server apparatus 2 is used at a call center of an organization that manages accidents on roads caused by automobiles 10 and the like. The client terminal 3 is used by a rescue team such as firefighters. The automatic report apparatus 4 is provided in each of the plurality of automobiles 10. The wireless communication network 5 provides a communication line to the server apparatus 2, the client terminal 3, and the automatic report apparatus 4. The wireless communication network 5 includes a plurality of base stations 6 and a communication network 7. The base stations 6 are provided in an area in a dispersed manner along roads, for example, to communicate with a wireless terminal such as the automatic report apparatus 4. The communication network 7 connects the base stations 6. Each of the base stations 6 functions as an access point to which a plurality of wireless terminals in a communicable zone are connected.

An example of the above emergency report system 1 used when an accident occurs is an advanced automatic collision notification (AACN) system. In the AACN system, automatic accident information is immediately transmitted from an automobile 10 that is involved in the accident to the server apparatus 2 at the call center, and, in response to a dispatch request from the call center, a rescue team is dispatched with an ambulance 11 or an air ambulance. The call center can select the rescue team corresponding to the situation of the accident to make a dispatch request. The ambulance 11 or air ambulance can be dispatched for the accident site with the situation of the accident grasped. This can immediately provide victims of the accident with an appropriate lifesaving treatment in a short lead time.

Note that FIG. 1 illustrates an example of the emergency report system 1 used by a plurality of organizations in cooperation. However, the emergency report system 1 may also be used by an organization alone that manages an area including roads on which the automobile 10 and the like can pass. Examples of the organization include the police, a fire department, a government office, a hospital, a medical institution, a security company, and a management company.

FIG. 1 illustrates a global navigation satellite system (GNSS) satellite 110. Each of the apparatuses in FIG. 1 may receive radio waves including location information such as latitude and longitude and time information of a plurality of GNSS satellites 110 so as to obtain the location and time of the corresponding apparatus. Furthermore, since the plurality of GNSS satellites 110 cooperate with each other, each of the plurality of apparatuses receiving radio waves therefrom may obtain the current time, current location, and other information of the corresponding apparatus with high accuracy. The plurality of apparatuses can use a common synchronized time.

FIG. 2 is an explanatory diagram of a control system 20 of the automobile 10. The control system 20 can serve as the automatic report apparatus 4 that transmits emergency information from the automobile 10 involved in an accident in FIG. 1.

In the control system 20 of the automobile 10 in FIG. 2, as a representative of each of a plurality of control apparatuses, a control electronic control unit (ECU) that is incorporated in a corresponding one of the control apparatuses is illustrated. In addition to the control ECU, the control apparatus may include, for example, a memory for recording a control program and data, an input/output port coupled to a control object or an apparatus that detects the state thereof, a timer for measuring time, and an internal bus to which the control ECU, the memory, the input/output port, and the timer are coupled.

In one example, the control ECUs illustrated in FIG. 2 are a driving ECU 21, a steering ECU 22, a braking ECU 23, a running control ECU 24, a driving operation ECU 25, a detection ECU 26, an external communication ECU 27, an internal communication ECU 28, a user interface (UI) operation ECU 29, and an occupant protection ECU 30. The control system 20 of the automobile 10 may include another control ECU (not illustrated).

The plurality of control ECUs are connected to a vehicle network 36 such as a controller area network (CAN) or a local interconnect network (LIN) employed in the automobile 10. The vehicle network 36 may include a plurality of bus cables 37 and a central gateway (CGW) 38. The plurality of control ECUs may be coupled via the bus cables 37, and the central gateway 38 serves as a relay apparatus to which the plurality of bus cables 37 are coupled. IDs as identification information different from each other are allocated to the plurality of control ECUs. Basically, a control ECU periodically outputs data to another control ECU. The data includes the ID of a control ECU from which the data is output and the ID of a control ECU to which the data is output. The other control ECU monitors the bus cables 37, and, if, for example, data includes the ID of the other control ECU as the ID of a control ECU to which the data is output, the other control ECU acquires the data and executes processing based on the data. The central gateway 38 monitors each of the plurality of bus cables 37 that are coupled thereto. Upon detection of data that is output from a control ECU coupled to a certain bus cable 37 to a control ECU coupled to another bus cable 37, the central gateway 38 outputs the data to the other bus cable 37. With such relay processing performed by the central gateway 38, data may be input and output between the plurality of control ECUs even if the control ECUs are coupled to different bus cables 37.

To the UI operation ECU 29, for example, a display device 41 and an operation device 42 are coupled as user interface devices for an occupant of the automobile 10. The display device 41 may be, for example, a liquid crystal device or a video projection device. The operation device 42 may be, for example, a touch panel, a keyboard, or a contactless operation detection device. The display device 41 and the operation device 42 may be installed, for example, on an inner surface of a cabin where an occupant boards. The UI operation ECU 29 acquires data from the vehicle network 36 and causes the display device 41 to display the data. The UI operation ECU 29 outputs an operation input on the operation device 42 to the vehicle network 36. The UI operation ECU 29 may further execute processing based on the operation input and may add the processing results to the data. For example, the UI operation ECU 29 may cause the display device 41 to display a navigation screen for setting a destination or the like, may search for a route to the destination selected by an operation input, and may add the route data to the data. The route data may include attribute information such as lanes of roads used for traveling from the current location to the destination.

To the driving operation ECU 25, for example, a steering wheel, a brake pedal, an accelerator pedal, a shift lever, and the like, which are not illustrated, are coupled as operation members for an occupant to control running of the automobile 10. In response to an operation on an operation member, the driving operation ECU 25 outputs data including the presence or absence of an operation, an operation amount, and the like to the vehicle network 36. The driving operation ECU 25 may further execute processing based on the operation on the operation member and may add the processing results to the data. For example, in a situation where another moving object or a fixed object is present in the traveling direction of the automobile 10, in response to an operation on the accelerator pedal, the driving operation ECU 25 may determine the abnormal operation and may add the determination results to the data.

To the detection ECU 26, as detection members for detecting the running state of the automobile 10, for example, a speed sensor 51, a three-axis acceleration sensor 52, a stereo camera 53, an in-vehicle camera 54, a microphone 55, a GNSS receiver 56, and the like are coupled. The speed sensor 51 detects the speed of the automobile 10. The three-axis acceleration sensor 52 detects the acceleration of the automobile 10. The stereo camera 53 captures images of the surroundings of the automobile 10. The in-vehicle camera 54 captures images of an occupant in the cabin. The microphone 55 converts sound inside and outside the vehicle into data. The GNSS receiver 56 locates the automobile 10. The GNSS receiver 56 receives radio waves from the plurality of GNSS satellites 110 and obtains the latitude and longitude that are the current location of the automobile 10 and the current time. The detection ECU 26 acquires detection information from the detection members and outputs data including the detection information to the vehicle network 36. The detection ECU 26 may further execute processing based on the detection information and may add the processing results to the data. For example, if the three-axis acceleration sensor 52 detects an acceleration exceeding a collision detection threshold, the detection ECU 26 may determine that a collision is detected and may add the collision detection results to the data. On the basis of an image captured by the stereo camera 53, the detection ECU 26 may extract an object that is present around the automobile 10, such as a pedestrian, another automobile 10, a street tree, a utility pole, or a guardrail. The detection ECU 26 may also determine the type or attribute of the object, and, in accordance with the position, size, and change of the object in the image, may estimate the relative direction, relative distance, and moving direction (if the object is moving) of the object. The detection ECU 26 may also add forecast information on a collision with another object including such estimation results to the data and may output the forecast information to the vehicle network 36.

To the external communication ECU 27, an external communication device 61 is coupled. The external communication ECU 27 and the external communication device 61 form an external communication terminal 60 as a communication apparatus provided for the automobile 10. The external communication device 61 wirelessly communicates with a base station 6 that is near the automobile 10 in the wireless communication network 5. The external communication ECU 27 transmits and receives data to and from the server apparatus 2 or the like via the wireless communication network 5 by wireless communication between the external communication device 61 and the base station 6. The external communication terminal 60 is a transmission apparatus provided for the automobile 10 and is a type of wireless terminal.

To the internal communication ECU 28, an internal communication device 71 is coupled. The internal communication device 71 performs, for example, near-field communication with a mobile terminal 121 of the occupant in the automobile 10. The mobile terminal 121 wirelessly communicates with a base station 6 that is nearby in the wireless communication network 5. The internal communication ECU 28 transmits and receives data to and from the mobile terminal 121 of the occupant of the automobile 10 by near-field communication between the internal communication device 71 and the mobile terminal 121 of the occupant.

The running control ECU 24 controls running of the automobile 10. For example, the running control ECU 24 acquires data from the external communication ECU 27, the detection ECU 26, the driving operation ECU 25, and the like via the vehicle network 36 and autonomously drives the automobile 10 or controls manual driving assistance for running of the automobile 10. The running control ECU 24 generates running control data for controlling running of the automobile 10 on the basis of acquired data and outputs the running control data to the driving ECU 21, the steering ECU 22, and the braking ECU 23. The driving ECU 21, the steering ECU 22, and the braking ECU 23 control running of the automobile 10 on the basis of the input running control data.

To the occupant protection ECU 30, a plurality of seat belt apparatuses, a plurality of airbag apparatuses, and an occupant protection memory 87 are coupled. The seat belt apparatuses include, for example, a driver-side seat belt apparatus 81 for an occupant who drives the automobile 10 and a passenger-side seat belt apparatus 82 for an occupant who boards the same automobile 10. The airbag apparatuses include, for example, a driver-side front airbag apparatus 83 that is deployed in front of the occupant who drives the automobile 10, a driver-side curtain airbag apparatus 84 that is deployed beside the occupant who drives the automobile 10 and along the inner surface of the automobile 10, a passenger-side front airbag apparatus 85 that is deployed in front of the occupant who boards the same automobile 10, and a passenger-side curtain airbag apparatus 86 that is deployed beside the occupant who boards the automobile 10 and along the inner surface of the automobile 10. The occupant protection ECU 30, the occupant protection memory 87, the driver-side seat belt apparatus 81, the passenger-side seat belt apparatus 82, the driver-side front airbag apparatus 83, the driver-side curtain airbag apparatus 84, the passenger-side front airbag apparatus 85, and the passenger-side curtain airbag apparatus 86 form an occupant protection apparatus 80.

On the basis of forecast information on a collision with another object or information on collision detection results from the detection ECU 26, the occupant protection ECU 30 activates or controls the seat belt apparatuses or the airbag apparatuses.

The occupant protection memory 87 is a computer-readable recording medium and has a program to be executed by the occupant protection ECU 30, set values, and the like recorded thereon. Information on details of control performed by the occupant protection ECU 30 may be recorded on the occupant protection memory 87. The occupant protection ECU 30 reads the program from the occupant protection memory 87 and executes the program. Thus, the occupant protection ECU 30 may serve as an occupant protection controller of the automobile 10.

The occupant protection ECU 30 as the occupant protection controller of the automobile 10 executes occupant protection control upon detection of a collision, for example, and also automatically collects and transmits emergency information or the like of the automobile 10. The occupant protection ECU 30 immediately transmits the collected information to the server apparatus 2 via the base station 6 and the communication network 7 by using the external communication terminal 60 that is capable of communicating with the base station 6.

FIG. 3 is an explanatory diagram of the server apparatus 2 used at the call center in FIG. 1.

The server apparatus 2 in FIG. 3 includes a server communication device 91, a server memory 92, a server CPU 93, a server GNSS receiver 94, a server monitor 95, a server call device 96, and a server bus 97 to which the server communication device 91, the server memory 92, the server CPU 93, the server GNSS receiver 94, the server monitor 95, and the server call device 96 are coupled.

The server communication device 91 is coupled to the communication network 7 of the wireless communication network 5. The server communication device 91 transmits and receives data to and from other apparatuses, for example, the external communication terminal 60 as a wireless terminal of the automobile 10 and the client terminal 3, via the wireless communication network 5.

The server GNSS receiver 94 receives radio waves from the GNSS satellites 110 to obtain the current time. The server apparatus 2 may include a server timer (not illustrated) to be calibrated by using the current time obtained by the server GNSS receiver 94.

The server monitor 95 displays information of the server apparatus 2. For example, the server monitor 95 displays emergency information received by the server apparatus 2 from the automobile 10 involved in an accident or the like.

The server call device 96 is used by a staff member at the call center to talk with a user of the mobile terminal 121 connected by using the server communication device 91.

The server memory 92 is a computer-readable recording medium and has a program to be executed by the server CPU 93, set values, and the like recorded thereon. Information on details of control by the server CPU 93 may be recorded on the server memory 92. The server CPU 93 reads the program from the server memory 92 and executes the program. Thus, a server controller is implemented in the server apparatus 2. The server CPU 93 as the server controller manages an overall operation of the server apparatus 2.

For example, upon the server communication device 91 receiving the emergency information immediately transmitted from each automobile 10 involved in an accident, the server CPU 93 of the server apparatus 2 at the call center causes the server monitor 95 to display the received emergency information. On the basis of the displayed emergency information from each automobile 10, a staff member at the call center judges the situation of the accident and inputs a dispatch request in accordance with the situation. The server CPU 93 transmits the dispatch request to the client terminal 3 by using the server communication device 91.

FIG. 4 is an explanatory diagram of the client terminal 3 used by the rescue team in FIG. 1.

The client terminal 3 in FIG. 4 includes a client communication device 101, a client memory 102, a client CPU 103, a client notification device 104, a client GNSS receiver 105, a client monitor 106, a client call device 107, and a client bus 108 to which the client communication device 101, the client memory 102, the client CPU 103, the client notification device 104, the client GNSS receiver 105, the client monitor 106, and the client call device 107 are coupled.

The client communication device 101 is coupled to the communication network 7 of the wireless communication network 5. The client communication device 101 transmits and receives data to and from other apparatuses, for example, the external communication device 61 as a wireless terminal of the automobile 10 and the server apparatus 2, via the wireless communication network 5.

The client GNSS receiver 105 receives radio waves from the GNSS satellites 110 to obtain the current time. The client terminal 3 may include a server timer (not illustrated) to be calibrated by using the current time obtained by the client GNSS receiver 105.

The client monitor 106 displays information of the client terminal 3. For example, the client monitor 106 displays a dispatch request or the like received from the server apparatus 2.

The client notification device 104 outputs a dispatch request sound to members of the rescue team.

The client call device 107 is used by a member of the rescue team to talk with a user of the mobile terminal 121 connected by using the client communication device 101.

The client memory 102 is a computer-readable recording medium and has a program to be executed by the client CPU 103, set values, and the like recorded thereon. Information on details of control by the client CPU 103 may be recorded on the client memory 102. The client CPU 103 reads the program from the client memory 102 and executes the program. Thus, a client controller is implemented in the client terminal 3. The client CPU 103 as the client controller manages an overall operation of the client terminal 3.

For example, upon the client communication device 101 receiving the dispatch request, the client CPU 103 of the client terminal 3 of the rescue team causes the client notification device 104 to notify the rescue team of the dispatch request. In this way, in response to the dispatch request, the rescue team can rush to the accident site with the ambulance 11 or air ambulance. The rescue team can be dispatched for the accident site with the situation of the accident grasped for each automobile 10. The rescue team can immediately provide a victim of the accident with an appropriate lifesaving treatment in a short lead time.

Figure 5:
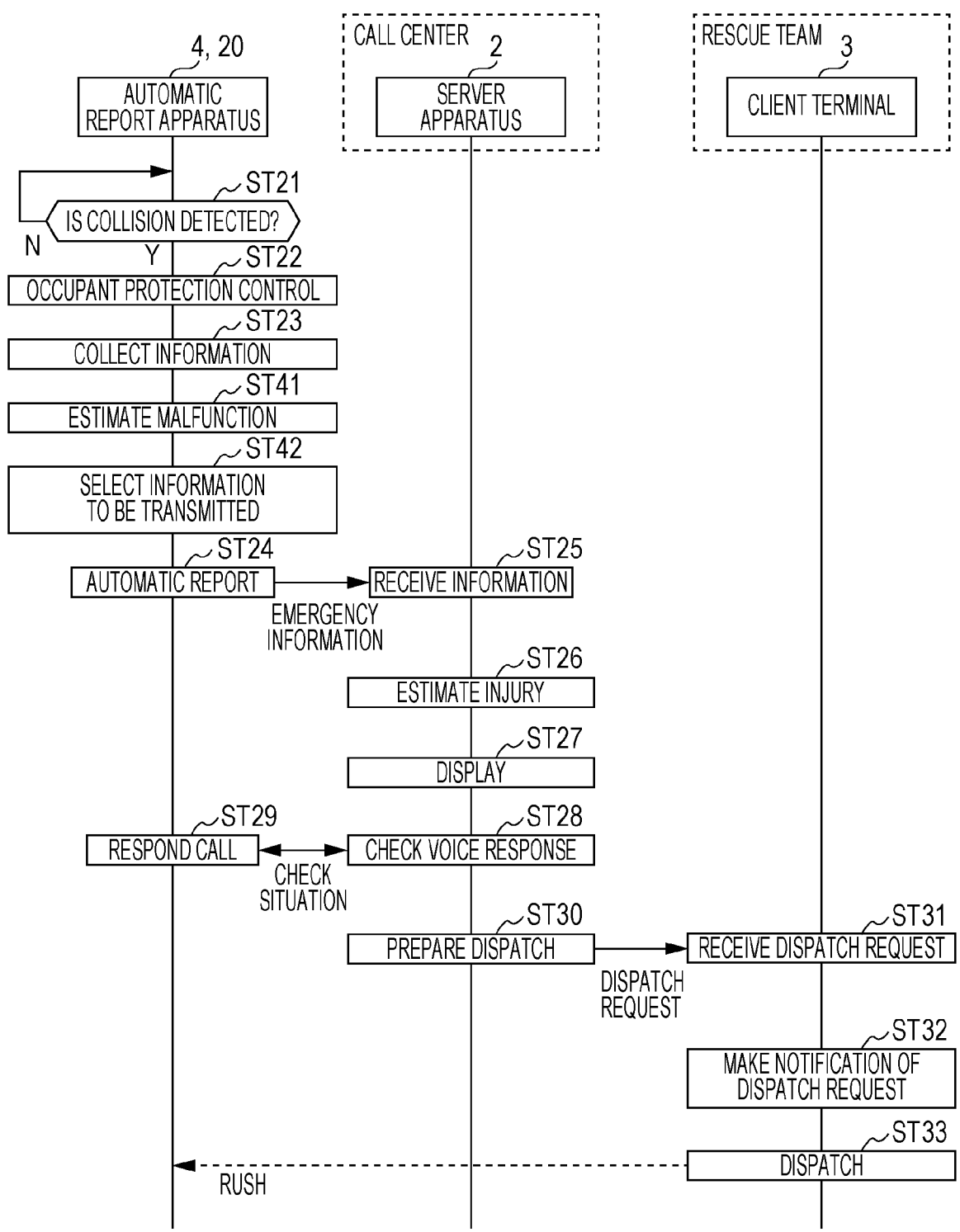
FIG. 5 is a sequence chart illustrating an example of a flow of fundamental processing in the emergency report system for the automobile in FIG. 1 from an automatic emergency report from the automobile involved in the accident to dispatch of the rescue team.

FIG. 5 is a sequence chart illustrating an example of a flow of fundamental processing in the emergency report system 1 for the automobile 10 in FIG. 1 from an automatic emergency report from the automobile 10 involved in the accident to dispatch of the rescue team.

FIG. 5 illustrates the control system 20 as the automatic report apparatus 4 of the automobile 10, the server apparatus 2 at the call center, and the client terminal 3 of the rescue team. Time flows from top to bottom.

In step ST21, the detection ECU 26 in the control system 20 of the automobile 10 detects a collision. The detection ECU 26 may detect a collision by determining whether another moving object approaching the automobile 10 is present on the basis of, for example, an image captured by the stereo camera 53. If no collision is detected, the detection ECU 26 repeats the processing in step ST21. Upon the collision being detected, the detection ECU 26 transmits detection information to the occupant protection ECU 30 and advances the processing to step ST22.

The detection ECU 26 may forecast that a collision is unavoidable before detecting the collision. In addition, on the basis of the forecast that the collision is unavoidable, the occupant protection ECU 30 may execute preliminary control for occupant protection before detecting the collision. As the preliminary control, the occupant protection ECU 30 may, for example, wind up surplus of a seat belt of a seat belt apparatus to set a pre-tension state or execute other processing. For example, the occupant protection ECU 30 may pre-deploy an airbag apparatus.

In step ST22, the occupant protection ECU 30 of the automobile 10 that has detected the collision executes occupant protection control on the basis of the information indicating that the detection ECU 26 detects the collision in step ST21. The occupant protection ECU 30 selects a seat belt apparatus and an airbag apparatus to be activated. The occupant protection ECU 30 may select a seat belt apparatus for the seat in which an occupant is seated and an airbag apparatus to be deployed in the direction in which the upper body of the occupant will fall due to the collision. The occupant protection ECU 30 winds up surplus of the seat belt of the selected seat belt apparatus to set a pre-tension state. On the basis of the input direction and strength of the forecasted collision, the occupant protection ECU 30 selects the airbag apparatus that can be deployed in the direction in which the upper body of the occupant will fall due to the collision.

In this embodiment, the occupant protection ECU 30 executes the occupant protection control after the collision has been detected in step ST21. However, the occupant protection ECU 30 may alternatively execute the occupant protection control at the stage of the preliminary control at which the collision is forecasted.

In step ST23, the occupant protection ECU 30 of the automobile 10 that has executed the occupant protection control collects accident emergency information. The accident emergency information may basically include accident information collected by the AACN system described above. The AACN system collects the accident information such as an operation state and the location of the occupant protection apparatus 80 at the time of the accident and the input direction and strength of the collision in the accident.

In step ST24, the external communication ECU 27 of the automobile 10 automatically transmits the collected emergency information.

In step ST25, the server communication device 91 of the server apparatus 2 at the call center receives the automatically reported emergency information from the automobile 10 involved in the accident. The automatically reported emergency information received by the server communication device 91 may be recorded on the server memory 92. Before or after step ST25, the server communication device 91 of the server apparatus 2 at the call center may receive the automatically reported emergency information from another automobile 10 involved in the same accident.

In step ST26, the server CPU 93 estimates the injury of the occupant of the automobile 10 by using the received accident information. As in the AACN system, the server CPU 93 may simply estimate, for example, the level of the injury of the occupant corresponding to an accident type based on the degree of collision with the automobile 10 and details of occupant protection.

In step ST27, the server CPU 93 causes the server monitor 95 to display the automatically reported emergency information received by the server communication device 91. For example, the server CPU 93 may color each occupant to be displayed in accordance with the estimated injury level of the occupant. On the basis of the accident emergency information displayed on the server monitor 95, a staff member at the call center can check the situation of the accident of the automobile 10.

In step ST28, the server CPU 93 communicates with the external communication ECU 27 of the automobile 10 involved in the accident. In step ST29, the occupant protection ECU 30 of the automobile 10 responds a voice call. Thus, a call line through which a call is possible is established between the server call device 96 and, for example, the microphone 55 of the automobile 10. The staff member at the call center checks the safety and health state of the occupant from the voice. This makes it possible to directly check the state such as the degree of the injury of the occupant of the automobile 10 involved in the accident. The staff member at the call center may input the check results to the server apparatus 2.

In step ST30, the server CPU 93 prepares the dispatch. The server CPU 93 transmits a dispatch request to the client terminal 3 of the rescue team by using the server communication device 91. The server CPU 93 may transmit the dispatch request in response to an operation performed by the staff member at the call center.

In step ST31, the client communication device 101 of the client terminal 3 of the rescue team receives the dispatch request from the server apparatus 2. The dispatch request received by the client communication device 101 may be recorded on the client memory 102.

In step ST32, the client CPU 103 makes a notification of the dispatch request. Upon the client communication device 101 receiving the dispatch request, the client CPU 103 causes the client notification device 104 to output a dispatch request sound. The client CPU 103 may also cause the client monitor 106 to display a dispatch request screen. The dispatch request screen may display the automatically reported information and the information input by the staff member at the call center.

In step ST33, members of the rescue team are dispatched in response to the request. The members of the rescue team can grasp that the dispatch request is made for the team from the dispatch request sound and the dispatch request screen and can be dispatched with the ambulance 11 or air ambulance.

Thus, on the basis of the accident emergency information automatically reported from the automobile 10 involved in the accident, the rescue team with the ambulance 11 or air ambulance can be dispatched in a minimum lead time without delay. The rescue team with the ambulance 11 or air ambulance can be dispatched in the appropriately prepared state on the basis of the accident emergency information acquired in advance. This increases the possibility of saving victims of the accident.

The automobile 10 may be involved in an accident at any place in any environment.

For example, as illustrated in FIG. 1, the automobile 10 may be involved in an accident in an environment where communication with a base station 6 of an old type is possible, such as a suburb. There is a possibility that the base station 6 installed in a suburb corresponds to a narrowband communication area of an old type and is not changed even if a base station 6 installed in an urban area is updated to a next-generation base station 6 to correspond to a broadband communication area. In addition, a suburb may include an area that corresponds to satellite communication that is not appropriate for large-capacity communication without a base station 6.

Furthermore, at a place where a plurality of automobiles 10 are already involved in an accident, a new automobile 10 may further be involved in the accident by being bumped, for example. In this case, at the same place, a large number of automobiles 10 may be going to automatically report emergency information about the accident simultaneously.

As a result, it may take time for each automobile 10 involved in the accident to complete transmission of the accident emergency information after having been involved in the accident. If the transmission of the emergency information from the automobile 10 involved in the accident delays, the time until the dispatch request for the rescue team based on the emergency information and the time for the rescue team to actually arrive at the accident site also delay.

In one example, in the future, it is assumed that the above-described emergency report system 1 using AACN is improved and that each automobile 10 involved in an accident automatically transmits a large amount of rich information to the server apparatus 2. By obtaining the large amount of rich information about the accident, the server apparatus 2 may become capable of estimating the injury state of each occupant or pedestrian involved in the accident in detail. The server apparatus 2 may become capable of, for example, estimating the injury of each occupant in detail by artificial intelligence processing based on detailed accident information, in addition to estimating the injury level of the occupant corresponding to the accident type as in the AACN system. The server apparatus 2 can estimate the injury of the occupant in detail by advanced information processing based on a large amount of information since the performance is not limited unlike the control ECUs of the automobile 10.

However, for example, automatic transmission of such a large amount of emergency information from a plurality of automobiles 10 to the server apparatus 2 in the above-described communication environment may become a large obstacle for immediate emergency dispatch in response to the emergency report.

Thus, it is desirable to provide the emergency report system 1 in which an automobile 10 involved in an accident can automatically report, to the server apparatus 2, information to be used for determination of the accident while suppressing delay of emergency dispatch in response to emergency information.

Accordingly, in this embodiment, after detection of the accident in step ST21 in FIG. 5, the occupant protection ECU 30 of the automobile 10 estimates a communication malfunction such as insufficient communication capacity in the communication environment in step ST41 and selects information to be transmitted in step ST42. In step ST24, the occupant protection ECU 30 automatically transmits, as the emergency information to the server apparatus 2, the selected information. For example, if the communication capacity is insufficient, the occupant protection ECU 30 does not transmit, to the server apparatus 2, all the information collected in step ST23 but transmits part of the information or the injury level of the occupant corresponding to the accident type determined by the occupant protection ECU 30. Thus, even if the communication capacity is insufficient, the occupant protection ECU 30 can immediately transmit the emergency information as a first report in a short time after the accident has been detected. In addition, since the emergency information as the first report includes information about the injury of the occupant to be estimated and determined by the server apparatus 2, the server apparatus 2 can cause the server monitor 95 to display information the amount of which is equivalent to that in a case where a large amount of information can be received. Now, details will be described.

Figure 6:
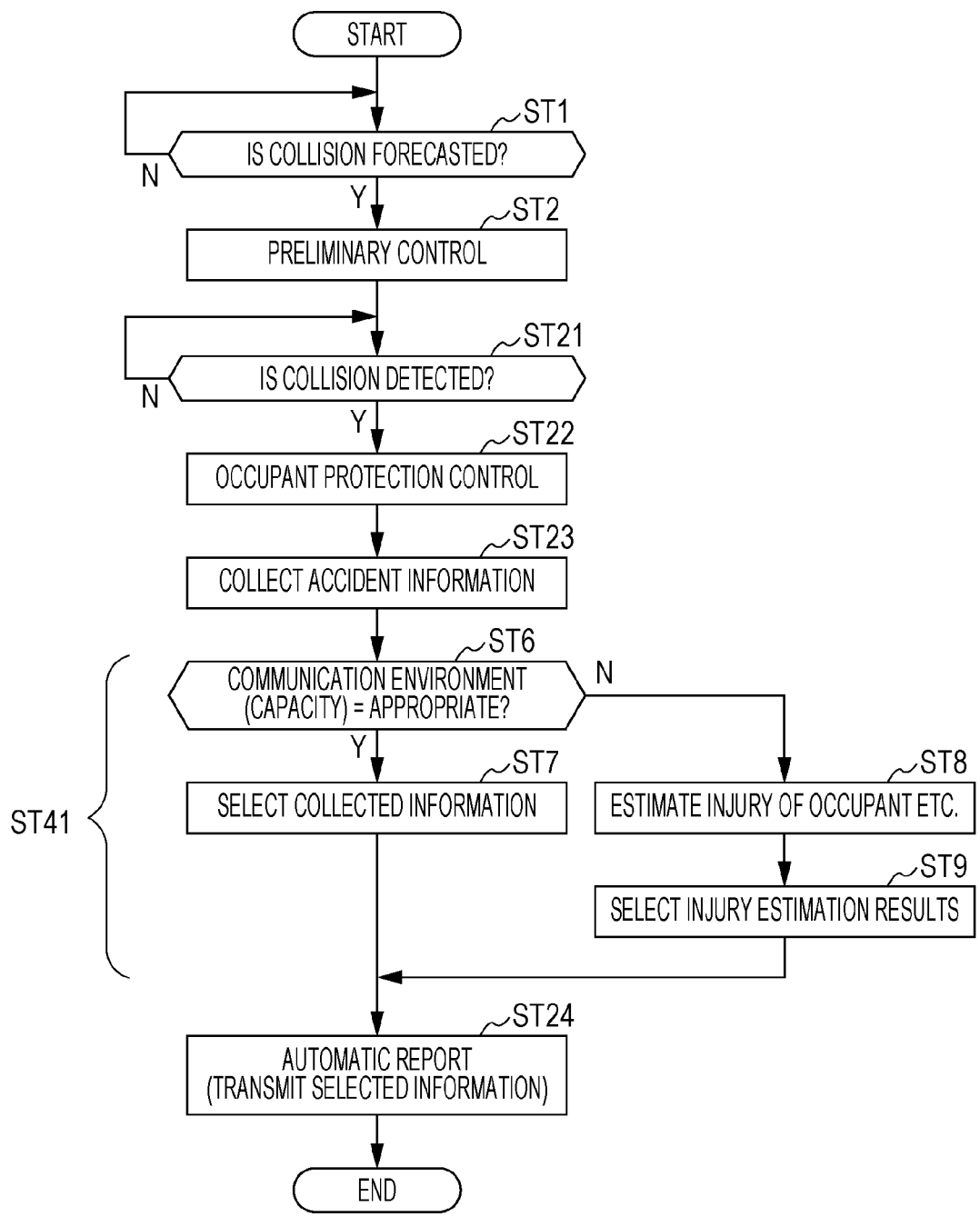
FIG. 6 is a flowchart of automatic report processing executed by the automobile in FIG. 1 for a first report on the accident.

FIG. 6 is a flowchart of automatic report processing executed by the automobile 10 in FIG. 1 for a first report on the accident.

The automobile 10 repeatedly executes the processing in FIG. 6.

In step ST1, the detection ECU 26 forecasts a collision of the automobile 10. The detection ECU 26 may forecast a collision by determining whether another moving object approaching the automobile 10 is present on the basis of, for example, an image captured by the stereo camera 53. If no collision is forecasted, the detection ECU 26 repeats the processing in step ST1. Upon the collision being forecasted, the detection ECU 26 transmits forecast information to the occupant protection ECU 30 and advances the processing to step ST2.

In step ST2, the occupant protection ECU 30 may execute preliminary control for occupant protection on the basis of the information of the collision forecasted by the detection ECU 26 in step ST1. The occupant protection ECU 30 selects a seat belt apparatus and an airbag apparatus to be activated. The occupant protection ECU 30 may select a seat belt apparatus for the seat in which an occupant is seated and an airbag apparatus to be deployed in the direction in which the upper body of the occupant will fall due to the collision. The occupant protection ECU 30 winds up surplus of the seat belt of the selected seat belt apparatus to set a pretension state. On the basis of the input direction and strength of the forecasted collision, the occupant protection ECU 30 selects the airbag apparatus that can be deployed in the direction in which the upper body of the occupant will fall due to the collision.

In step ST21, the detection ECU 26 detects a collision of the automobile 10. The detection ECU 26 detects a collision if, for example, the acceleration detected by the three-axis acceleration sensor 52 is greater than a predetermined threshold. If no collision is detected, the detection ECU 26 repeats the processing in step ST21. Upon the collision being detected, the detection ECU 26 transmits collision detection information to the occupant protection ECU 30 and advances the processing to step ST22. Note that the detection ECU 26 may end the processing if no collision is detected after a certain period of time elapsed from the start of the processing.

In step ST22, the occupant protection ECU 30 executes occupant protection control on the basis of the information indicating that the detection ECU 26 detects the collision in step ST21. The occupant protection ECU 30 activates the selected seat belt apparatus and airbag apparatus. Thus, the seated occupant is constrained in the seat, or, even if the occupant falls from the seat, the airbag can absorb the collision.

In this embodiment, the occupant protection ECU 30 executes the occupant protection control after the collision has been detected in step ST21. However, the occupant protection ECU 30 may alternatively execute the occupant protection control at the stage of the preliminary control in step ST2 after the collision has been forecasted in step ST1.

In step ST23, in the automobile 10, the occupant protection ECU 30 collects information of the automobile 10 involved in the accident. The occupant protection ECU 30 collects information to be used for determining malfunction of the automobile 10 and the injury of the occupant or the like due to the accident in detail from each unit of the automobile 10. For example, the occupant protection ECU 30 may acquire a large amount of information such as information on the location and time at the time of the accident generated by the GNSS receiver 56, information on the seat belt apparatus and airbag apparatus activated by the occupant protection ECU 30, information on the acceleration and direction of the collision at the time of the accident detected by the three-axis acceleration sensor 52, a movie of the inside of the vehicle captured by the in-vehicle camera 54, a movie of the outside of the vehicle captured by the stereo camera 53, and log data of the speed or acceleration indicating behaviors of the automobile 10 before and after the accident.

In step ST6, the external communication ECU 27 starts the processing in step ST41 and determines whether the communication environment is appropriate for use of the external communication terminal 60.

In response to traveling of the automobile 10, connection between the external communication terminal 60 and any of the plurality of base stations 6 is switched. The base stations 6 include a base station capable of high-speed broadband communication and an old-type base station capable of narrowband communication. In this case, the external communication terminal 60 can transmit and receive data to and from a base station 6 in accordance with the communication capacity of the base station 6 that accommodates the external communication terminal 60. In addition, external communication terminals 60 of a plurality of automobiles 10 are concurrently connected to a single base station 6. In this case, the base station 6 allocates a band to each of the external communication terminals 60. In this case, the external communication terminal 60 can transmit and receive data to and from the base station 6 in the allocated band.

The external communication ECU 27 determines whether the communication environment is appropriate on the basis of, for example, whether the communication environment such as the communication capacity between the external communication terminal 60 and the base station 6 being in a state that the information collected in step ST23 can be transmitted to the server apparatus 2 in a short time. The external communication ECU 27 may obtain the communication capacity allocated to the communication with the external communication terminal 60 on the basis of the type of communication standard of the base station 6 or the state of the base station 6 such as the number of communication apparatuses accommodated in the base station 6. If the communication capacity is sufficient for the information amount, the external communication ECU 27 determines that the communication environment is appropriate and advances the processing to step ST7. If the communication capacity is insufficient for the information amount, the external communication ECU 27 determines that the communication environment is inappropriate and advances the processing to step ST8.

In step ST7, the occupant protection ECU 30 selects the emergency information to be automatically reported. Herein, since the communication environment is in such a state that the information collected in step ST23 can be transmitted to the server apparatus 2 in a short time, the occupant protection ECU 30 selects the information collected in step ST23 as the emergency information.

In step ST8, the occupant protection ECU 30 or the detection ECU 26 estimates the injury of the occupant of the automobile 10 or another party. By using the information collected in step ST23, the occupant protection ECU 30 or the detection ECU 26 estimates the injury of the occupant of the automobile 10 or another party. Note that the processing performance of the occupant protection ECU 30 or the detection ECU 26 is typically lower than the processing performance of the server CPU 93. Thus, the occupant protection ECU 30 or the detection ECU 26 may estimate, for example, the injury rank of the occupant on the basis of the accident type using details of the collision and details of occupant protection, instead of estimating the injury in detail as in the server CPU 93. The injury rank may be, for example, A, B, or C in accordance with the degree of injury. Thus, the time for the occupant protection ECU 30 or the detection ECU 26 to estimate the injury can be suppressed to be extremely short. If the communication environment is inappropriate, the occupant protection ECU 30 or the detection ECU 26 estimates the injury of the occupant or the like in the automobile 10 by using the collected information.

In step ST9, the occupant protection ECU 30 selects the emergency information to be automatically reported. Herein, the occupant protection ECU 30 selects, as the emergency information, the estimation results of the injury of the occupant or the like estimated in the automobile 10. Thus, if the communication environment is inappropriate after the accident of the automobile 10 has been detected or forecasted, the occupant protection ECU 30 selects, as the emergency information, the estimation results of the injury of the occupant or the like estimated in the automobile 10 instead of the collected information of the automobile 10.

In step ST24, the external communication ECU 27 automatically reports the accident emergency information. By using the external communication device 61, the external communication ECU 27 transmits the accident emergency information to the server apparatus 2 via the base station 6 and the communication network 7.

For example, if the communication environment is appropriate for the transmission of the collected information, the external communication ECU 27 transmits, as the emergency information to the server apparatus 2, the collected information. Thus, the external communication ECU 27 automatically transmits, from the automobile 10 to the server apparatus 2, the accident emergency information that can be used by the server apparatus 2 to estimate the injury of the occupant or the like of the automobile 10 to request an emergency dispatch.

In contrast, if the communication environment is inappropriate for the transmission of the collected information, instead of the collected information, the external communication ECU 27 transmits, as the emergency information to the server apparatus 2, the determination results of the injury determined by the automobile 10. Herein, together with the determination results of the injury determined by the automobile 10, the external communication ECU 27 may transmit information such as the location and time of the accident that has occurred, the boarding position and the number of occupants, details of occupant protection, details of the collision (input part, strength, or input direction), which are requested to be transmitted in the AACN system. The external communication ECU 27 can immediately complete transmission of the emergency information of such an amount even if the external communication terminals 60 of the plurality of automobiles 10 are accommodated in an old-type base station 6 that is capable of narrowband communication.

Figure 7:
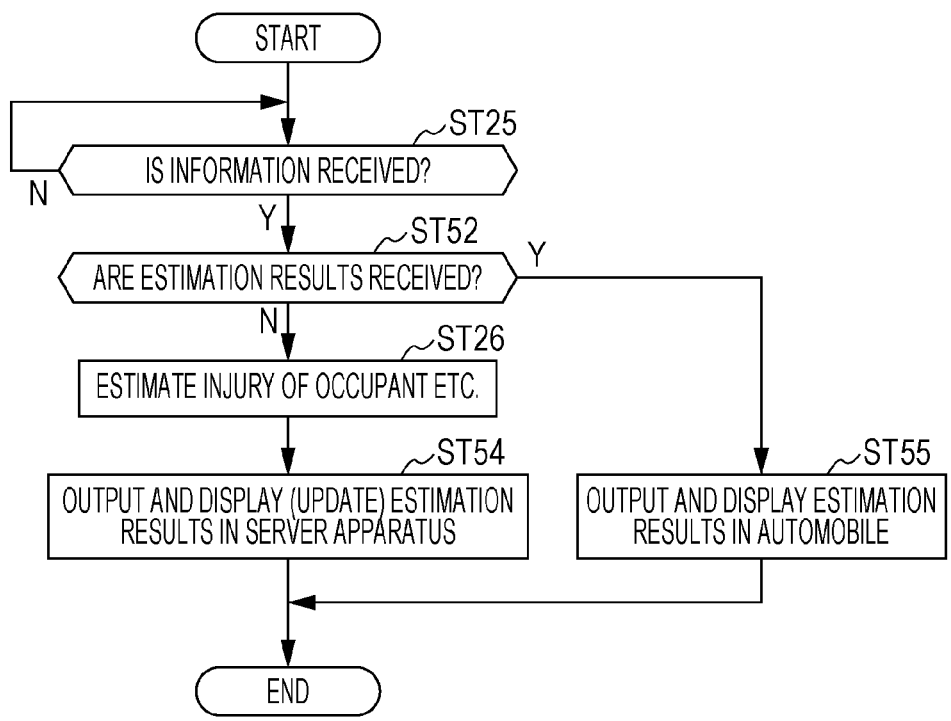
FIG. 7 is a flowchart of processing executed by the server apparatus in FIG. 1 upon receiving new information from the automobile.

FIG. 7 is a flowchart of processing executed by the server apparatus 2 in FIG. 1 upon receiving new information from the automobile 10.

The server CPU 93 of the server apparatus 2 repeatedly executes the processing in FIG. 7.

In step ST25, the server CPU 93 determines whether the server communication device 91 receives accident emergency information transmitted from the automobile 10 involved in an accident. If no emergency information on a new accident is received, the server CPU 93 repeats the processing in step ST25. If the emergency information on a new accident is received, the server CPU 93 advances the processing to step ST52.

In step ST52, the server CPU 93 determines whether the information received from the automobile 10 involved in the accident includes information on estimation results of injury determined by the automobile 10. As described above, the occupant protection ECU 30 transmits either the emergency information including the information on estimation results of injury determined by the automobile 10 or the emergency information not including the information on estimation results of injury, depending on the communication environment. If the information on estimation results of injury determined by the automobile 10 is not included, the occupant protection ECU 30 advances the processing to step ST26. If the information on estimation results of injury determined by the automobile 10 is included, the occupant protection ECU 30 advances the processing to step ST55.

In step ST26, the server CPU 93 estimates the injury state of the occupant or the like of the automobile 10 in detail in the server apparatus 2. For example, on the basis of detailed information on the accident determined by using the received large amount of information, the server CPU 93 may estimate the injury state of each occupant in detail by artificial intelligence processing. Thus, upon receiving the emergency information, the server CPU 93 estimates the injury of the occupant or the like of the automobile 10 on the basis of the emergency information.

In step ST54, the server CPU 93 outputs, to the server monitor 95, estimation results of the injury of the occupant or the like estimated in the server apparatus 2, and the server monitor 95 displays the estimation results. Thus, as the processing in step ST27 in FIG. 5, the server CPU 93 outputs the estimation results of the injury of the occupant or the like estimated in the server apparatus 2.

In step ST55, the server CPU 93 outputs, to the server monitor 95, estimation results of the injury of the occupant or the like estimated in the automobile 10, and the server monitor 95 displays the estimation results. Thus, as the processing in step ST27 in FIG. 5, the server CPU 93 outputs the received estimation results of the injury of the occupant or the like estimated in the automobile 10.

Figure 8:
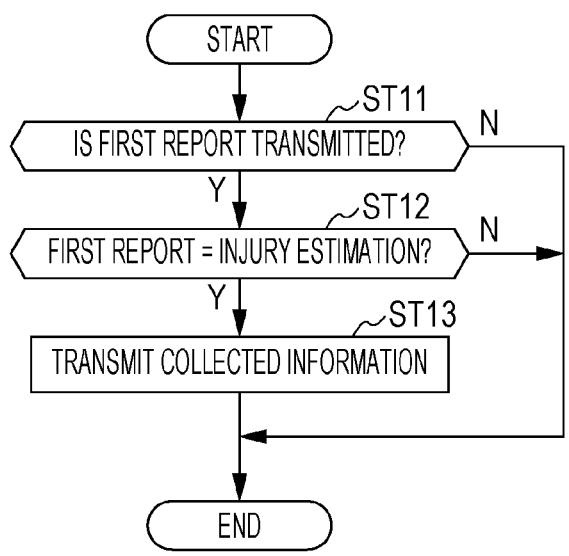
FIG. 8 is a flowchart of automatic report processing executed by the automobile after the first report on the accident.

FIG. 8 is a flowchart of automatic report processing executed by the automobile 10 after the first report on the accident.

The automobile 10 repeatedly executes the processing in FIG. 8.

In step ST11, the external communication ECU 27 determines whether the first report on the accident has been transmitted. Herein, the first report on the accident refers to emergency information that is initially transmitted after the accident. If the automatic report processing in FIG. 6 is completed after the accident, the external communication ECU 27 has transmitted the first report on the accident. In this case, the external communication ECU 27 advances the processing to step ST12. If the first report on the accident is not transmitted, the external communication ECU 27 ends the processing.

In step ST12, the external communication ECU 27 determines whether the first report includes estimation results of the injury of the occupant or the like estimated in the automobile 10. If the first report includes the estimation results of the injury of the occupant or the like estimated in the automobile 10, the external communication ECU 27 advances the processing to step ST13. If the first report does not include the estimation results of the injury of the occupant or the like estimated in the automobile 10, the external communication ECU 27 ends the processing.

In step ST13, since the external communication ECU 27 has not transmitted the collected information as the first report including the estimation results of the injury of the occupant or the like estimated in the automobile 10, the external communication ECU 27 transmits the collected information to the server apparatus 2. By using the external communication device 61, the external communication ECU 27 transmits the collected information to the server apparatus 2 via the base station 6 and the communication network 7. Thus, if the communication environment is inappropriate, the external communication ECU 27 can initially transmit, as the emergency information to the server apparatus 2, the estimation results of the injury of the occupant or the like estimated in the automobile 10 and can then transmit the collected information of the automobile 10 to the server apparatus 2.

Thus, the server apparatus 2 can receive the information collected in the automobile 10 from the automobile 10 involved in the accident. The server CPU 93 determines that the information received in step ST52 in FIG. 7 does not include the information on the estimation results of the injury determined by the automobile 10. In step ST26, on the basis of detailed information on the accident determined by using the received large amount of information, the server CPU 93 may estimate the injury state of each occupant in detail by artificial intelligence processing. In step ST54, the server CPU 93 outputs, to the server monitor 95, estimation results of the injury of the occupant or the like estimated in the server apparatus 2, and the server monitor 95 displays the estimation results. Thus, the estimation results of the injury of the occupant or the like displayed on the basis of the first report are updated.

As described above, in this embodiment, if an accident is detected or forecasted, the automobile 10 collects accident emergency information that is usable by the server apparatus 2 for requesting emergency dispatch to estimate the injury of the occupant or the like of the automobile 10, automatically transmits the collected information to the server apparatus 2, and determines whether the communication environment for transmitting the information from the automobile 10 to the server apparatus 2 is appropriate, that is, the communication capacity is sufficient, for transmitting the collected information as the emergency information to the server apparatus 2 in a short time. If the communication environment is inappropriate, by using the collected information, the automobile 10 estimates the injury of the occupant or the like, and, instead of the collected information of the automobile 10, transmits, as the emergency information to the server apparatus 2, estimation results of the injury of the occupant or the like. Thus, the automobile 10 can transmit the emergency information with information amount thereof controlled depending on the information amount that can be immediately transmitted in the communication environment. In addition, even if, for example, the communication environment is inappropriate for transmitting information to be used by the server apparatus 2 to estimate the injury of the occupant or the like of the automobile 10 in a short time, the server apparatus 2 can output estimation results of the injury of the occupant or the like.

According to this embodiment, in the emergency report system 1 in which a large amount of information can be transmitted from the automobile 10 to the server apparatus 2 so that the server apparatus 2 may estimate the injury state of the occupant or the like involved in the accident in detail, even if the communication environment is inappropriate, estimation results of the injury of the occupant or the like estimated in the server apparatus 2 can be output. This embodiment enables appropriate automatic report of information to be used for determination of the accident from the automobile 10 involved in the accident to the server apparatus 2 so as to suppress delay of a request for emergency dispatch based on the emergency information.

In this embodiment, if the communication environment is inappropriate, first, the automobile 10 initially transmits, as the emergency information to the server apparatus 2, estimation results of the injury of the occupant or the like estimated in the automobile 10, and then transmits the collected information of the automobile 10 to the server apparatus 2. Thus, the server apparatus 2 can output the estimation results of the injury of the occupant or the like as a first report about the accident without great delay from the accident. Furthermore, the server apparatus 2 can estimate and output the injury of the occupant or the like with higher accuracy on the basis of a large amount of detailed information that is received later. On the basis of the first report, a staff member at the call center can immediately request dispatch in accordance with the injury state of the occupant or the like. Furthermore, since the injury state of the occupant or the like is updated later to be more accurate, the staff member can request a rescue team for appropriate preparation in accordance with the updated injury state. For example, on the basis of the first report, the staff member can tell the rescue team about the possibility that the occupant is injured in the neck, and further can tell them whether the injury in the neck is comparatively minor because the upper body of the occupant is shaken or comparatively serious by the input of collision to their head or neck.

The above-described embodiment is an example of an embodiment of the disclosure, and the disclosure is not limited thereto. Various modifications or changes may be made without departing from the gist of the disclosure.

In the embodiment described above, the plurality of ECUs are present in a separated manner in the automobile 10, but some or all of the ECUs may be integrated into one ECU.

In the disclosure, if an accident is detected or forecasted, a vehicle collects accident emergency information that is usable by a server apparatus to estimate the injury of an occupant or the like of the vehicle, automatically transmits the collected information to the server apparatus, and determines whether a communication environment for transmitting the information from the vehicle to the server apparatus is appropriate for transmitting the collected information. By using the collected information, the vehicle estimates the injury of the occupant or the like in the vehicle, and, instead of the collected information of the vehicle, transmits, as emergency information to the server apparatus, estimation results of the injury of the occupant. Thus, even if, for example, the communication environment is inappropriate for transmitting information to be used by the server apparatus to estimate the injury of the occupant of the vehicle in a short time, the server apparatus can output estimation results of the injury of the occupant or the like.

According to the disclosure, in an emergency report system in which a large amount of information can be transmitted from the vehicle to the server apparatus so that the server apparatus may estimate the injury state of the occupant or the like involved in the accident in detail, even if the communication environment is inappropriate, at least estimation results of the injury of the occupant estimated in the server apparatus can be output by transmission of a small amount of information. The disclosure enables appropriate automatic report of minimum or high-priority information to be used for determination of the accident from the vehicle involved in the accident to the server apparatus so as to suppress delay of a request for emergency dispatch based on the emergency information from the vehicle involved in the accident.

The occupant protection ECU 30 and the detection ECU 26 in the control system 20 of the automobile 10 and the server CPU 93 of the server apparatus 2 illustrated in FIGS. 2 and 3 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the occupant protection ECU 30 and the detection ECU 26 in the control system 20 of the automobile 10 and the server CPU 93 of the server apparatus 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIGS. 2 and 3.

The invention claimed is:

1. A vehicle with an automatic accident report function, the vehicle comprising:
   a transmitter configured to automatically transmit, from the vehicle to a server apparatus, accident emergency information that is usable by the server apparatus to estimate injury of an occupant of the vehicle when an accident of the vehicle is detected or forecasted;
   a collector configured to collect, in the vehicle, information of the vehicle involved in the accident;
   a determiner configured to determine whether a communication environment is appropriate for transmission of the information from the transmitter to the server apparatus; and
   a vehicle estimator configured to estimate the injury of the occupant of the vehicle, using the information collected by the collector,
   wherein, if the communication environment is inappropriate for the transmission of the collected information, the transmitter transmits, as the emergency information to the server apparatus, estimation results of the injury of the occupant estimated by the vehicle estimator, instead of the information of the vehicle collected by the collector.

2. The vehicle with an automatic accident report function according to claim 1,
   wherein the determiner determines the communication environment on a basis of, at least one of a type of a base station with which the transmitter communicates, or a state of the base station including a communication capacity or a number of communication apparatuses accommodated in the base station.

3. The vehicle with an automatic accident report function according to claim 2,
   wherein, in accordance with the communication environment determined by the determiner, the transmitter
      transmits, as the emergency information to the server apparatus, the information of the vehicle collected by the collector if the communication environment is appropriate, and
      transmits, as the emergency information to the server apparatus, the estimation results of the injury of the occupant estimated by the vehicle estimator if the communication environment is inappropriate.

4. The vehicle with an automatic accident report function according to claim 3,
   wherein, if the communication environment is inappropriate, the transmitter initially transmits, as the emergency information to the server apparatus, the estimation results of the injury of the occupant estimated by the vehicle estimator and then transmits the information of the vehicle collected by the collector to the server apparatus.

5. The vehicle with an automatic accident report function according to claim 2,
   wherein, if the communication environment is inappropriate, the transmitter initially transmits, as the emergency information to the server apparatus, the estimation results of the injury of the occupant estimated by the vehicle estimator and then transmits the information of the vehicle collected by the collector to the server apparatus.

6. The vehicle with an automatic accident report function according to claim 1,
   wherein, in accordance with the communication environment determined by the determiner, the transmitter
      transmits, as the emergency information to the server apparatus, the information of the vehicle collected by the collector if the communication environment is appropriate, and
      transmits, as the emergency information to the server apparatus, the estimation results of the injury of the occupant estimated by the vehicle estimator if the communication environment is inappropriate.

7. The vehicle with an automatic accident report function according to claim 6,
   wherein, if the communication environment is inappropriate, the transmitter initially transmits, as the emergency information to the server apparatus, the estimation results of the injury of the occupant estimated by the vehicle estimator and then transmits the information of the vehicle collected by the collector to the server apparatus.

8. The vehicle with an automatic accident report function according to claim 1,
   wherein, if the communication environment is inappropriate, the transmitter initially transmits, as the emergency information to the server apparatus, the estimation results of the injury of the occupant estimated by the vehicle estimator and then transmits the information of the vehicle collected by the collector to the server apparatus.

9. A vehicle with an automatic accident report function, the vehicle comprising:
   a transmitter configured to automatically transmit, from the vehicle to a server apparatus, accident emergency information that is usable by the server apparatus to estimate injury of an occupant of the vehicle when an accident of the vehicle is detected or forecasted; and
   circuitry configured to
      collect, in the vehicle, information of the vehicle involved in the accident,
      determine whether a communication environment is appropriate for transmission of the information from the transmitter to the server apparatus, and
      estimate the injury of the occupant of the vehicle, using the information collected by the collector,
   wherein, if the communication environment is inappropriate for the transmission of the collected information, the transmitter transmits, as the emergency information to the server apparatus, estimation results of the injury of the occupant, instead of the information of the vehicle collected by the collector.

* * * * *